US012639875B2

(12) United States Patent　　(10) Patent No.: US 12,639,875 B2
Liu　　(45) Date of Patent: May 26, 2026

(54) METHODS AND APPARATUSES FOR RENDERING A HAIR VIRTUAL MODEL, COMPUTER DEVICES, AND STORAGE MEDIA

(71) Applicant: NETEASE (HANGZHOU) NETWORK CO., LTD., Hangzhou (CN)

(72) Inventor: Zhongyuan Liu, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 188 days.

(21) Appl. No.: 18/556,086

(22) PCT Filed: Sep. 15, 2022

(86) PCT No.: PCT/CN2022/119162
　§ 371 (c)(1),
　(2) Date: Oct. 18, 2023

(87) PCT Pub. No.: WO2023/213037
　PCT Pub. Date: Nov. 9, 2023

(65) Prior Publication Data
　US 2025/0078374 A1　　Mar. 6, 2025

(30) Foreign Application Priority Data
　May 6, 2022　(CN) .......................... 202210488443.4

(51) Int. Cl.
　*G06T 13/40*　　(2011.01)
　*G06T 15/00*　　(2011.01)
(52) U.S. Cl.
　CPC .............. *G06T 13/40* (2013.01); *G06T 15/00* (2013.01)

(58) Field of Classification Search
　CPC ..... G06T 13/40; G06T 15/00; G06T 2210/56; G06T 15/005; G06T 17/20; G06T 19/20; A63F 13/52; A63F 2300/6638
　See application file for complete search history.

(56) References Cited

U.S. PATENT DOCUMENTS

2007/0159049 A1　7/2007　Kim et al.
2022/0084226 A1*　3/2022　Uludag ................... G06T 11/40

FOREIGN PATENT DOCUMENTS

| CN | 105574913 A | 5/2016 |
| CN | 107005689 A | 8/2017 |

(Continued)

OTHER PUBLICATIONS

Yuksel et al (NPL), (2010), "Advanced Techniques in Real-time Hair Rendering and Simulation". (Year: 2010).*

(Continued)

*Primary Examiner* — Daniel F Hajnik
*Assistant Examiner* — Adeel Bashir
(74) *Attorney, Agent, or Firm* — PV IP PC; Wei Te Chung

(57)　　　　ABSTRACT

A method for rendering a hair virtual model includes: obtaining particle attribute information of a hair particle in a hair particle model simulating a target hair rendering effect; obtaining a hair particle order parameter indicating an order of respective distances of each hair particle from a specified reference point in a model space; determining a target hair particle of the hair particle based on the hair particle order; and obtaining a rendered hair virtual model by determining a hair segment rendering region based on the particle attribute information of the target hair particle and rendering the hair segment rendering region to obtain a rendered hair virtual model.

18 Claims, 8 Drawing Sheets

(56)　　　　　　　References Cited

FOREIGN PATENT DOCUMENTS

| | | | |
|---|---|---|---|
| CN | 107918949 | A | 4/2018 |
| CN | 114404953 | A | 4/2022 |
| CN | 114782605 | A | 7/2022 |
| WO | 2019123213 | A1 | 6/2019 |

OTHER PUBLICATIONS

Sintorn et al (NPL), (2009), "Hair Self Shadowing and Transparency Depth Ordering Using Occupancy Maps". (Year: 2009).*
Chinese Office Action issued in corresponding Chinese Patent Application No. 202210488443.4 dated Apr. 9, 2025, pp. 1-7.
Electronic Publishing Issue 1 Jan. 10, 1999 ALIAS particle effect system particle texture design scheme and parameters and options Guan Chen.
International Search Report in International application No. PCT/CN2022/119162,mailed on Jan. 20, 2023.
Written Opinion of the International Search Authority in International application No. PCT/CN2022/119162,mailed on Jan. 20, 2023.

* cited by examiner

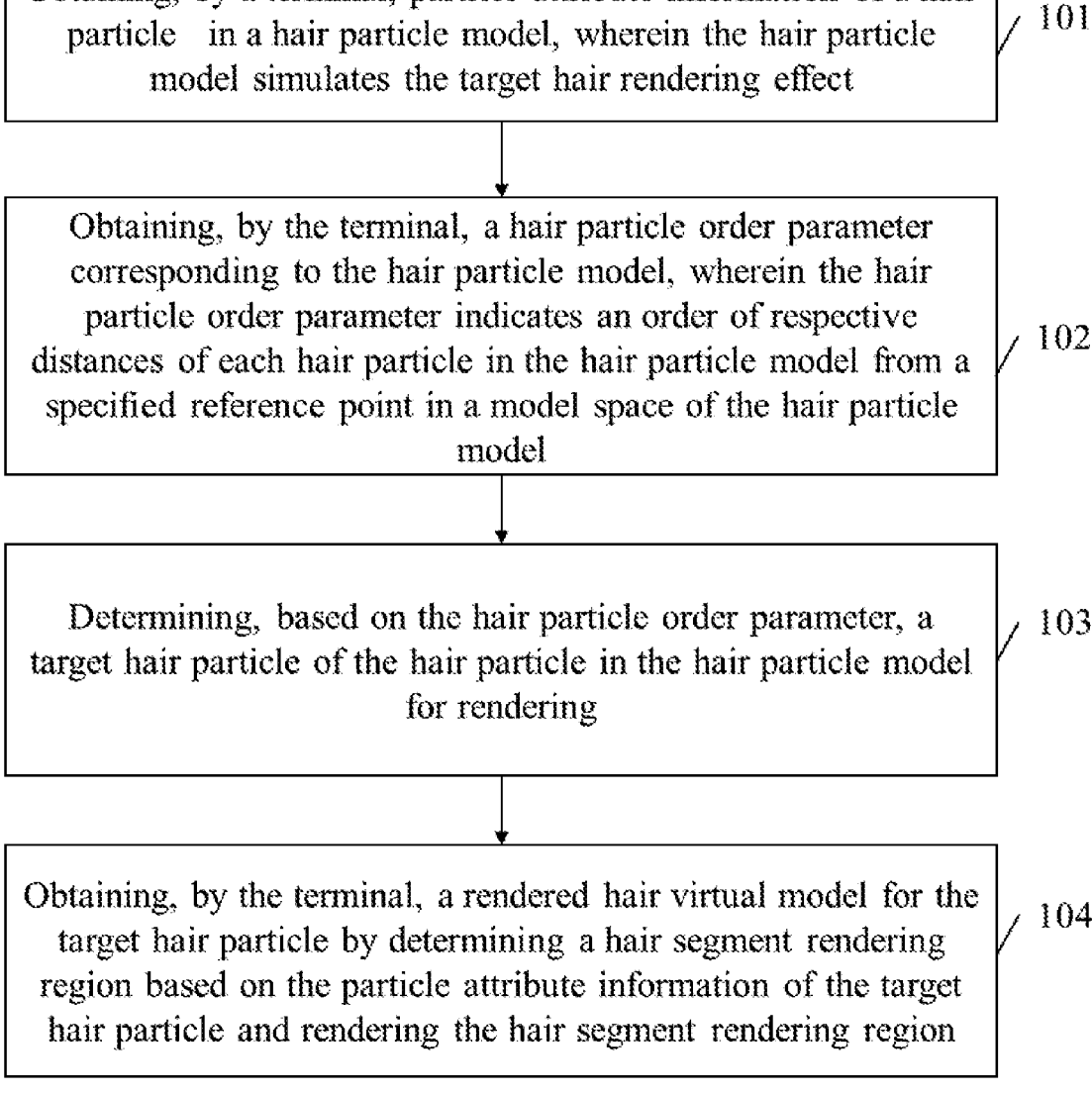

Obtaining, by a terminal, particle attribute information of a hair particle in a hair particle model, wherein the hair particle model simulates the target hair rendering effect   / 101

Obtaining, by the terminal, a hair particle order parameter corresponding to the hair particle model, wherein the hair particle order parameter indicates an order of respective distances of each hair particle in the hair particle model from a specified reference point in a model space of the hair particle model   / 102

Determining, based on the hair particle order parameter, a target hair particle of the hair particle in the hair particle model for rendering   / 103

Obtaining, by the terminal, a rendered hair virtual model for the target hair particle by determining a hair segment rendering region based on the particle attribute information of the target hair particle and rendering the hair segment rendering region   / 104

FIG. 1

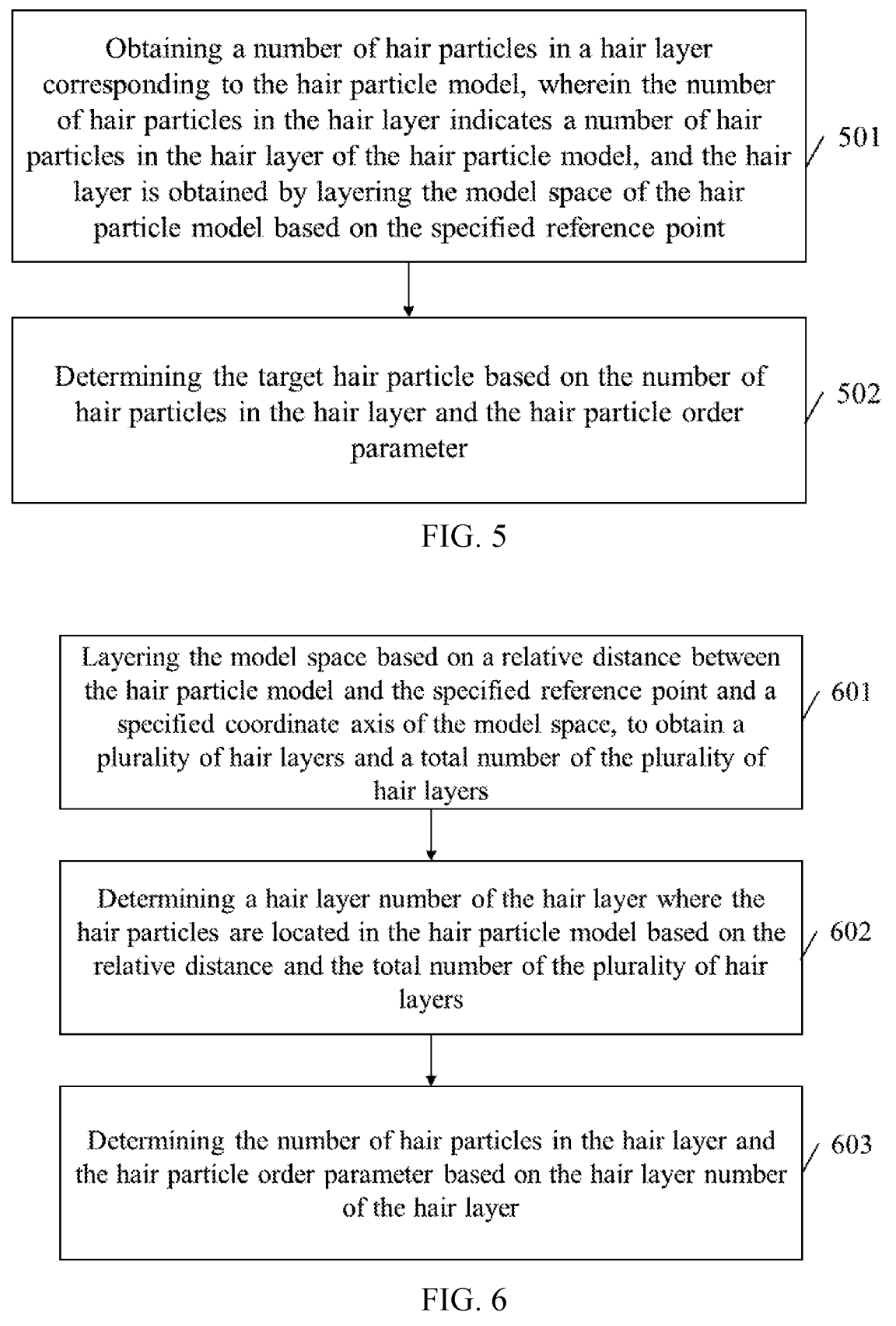

Obtaining a number of hair particles in a hair layer corresponding to the hair particle model, wherein the number of hair particles in the hair layer indicates a number of hair particles in the hair layer of the hair particle model, and the hair layer is obtained by layering the model space of the hair particle model based on the specified reference point — 501

Determining the target hair particle based on the number of hair particles in the hair layer and the hair particle order parameter — 502

FIG. 5

Layering the model space based on a relative distance between the hair particle model and the specified reference point and a specified coordinate axis of the model space, to obtain a plurality of hair layers and a total number of the plurality of hair layers — 601

Determining a hair layer number of the hair layer where the hair particles are located in the hair particle model based on the relative distance and the total number of the plurality of hair layers — 602

Determining the number of hair particles in the hair layer and the hair particle order parameter based on the hair layer number of the hair layer — 603

FIG. 6

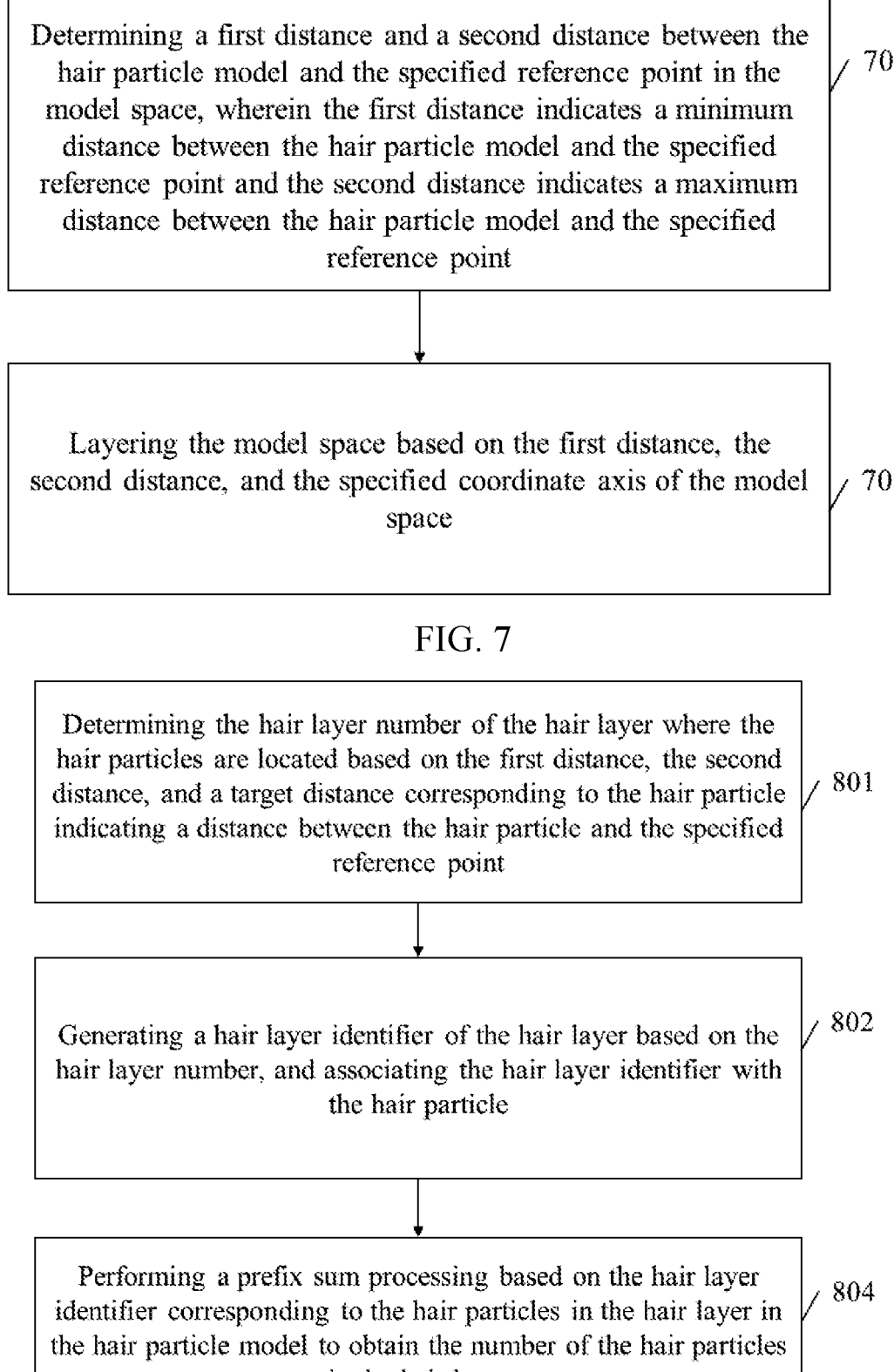

Determining a first distance and a second distance between the hair particle model and the specified reference point in the model space, wherein the first distance indicates a minimum distance between the hair particle model and the specified reference point and the second distance indicates a maximum distance between the hair particle model and the specified reference point / 701

Layering the model space based on the first distance, the second distance, and the specified coordinate axis of the model space / 702

FIG. 7

Determining the hair layer number of the hair layer where the hair particles are located based on the first distance, the second distance, and a target distance corresponding to the hair particle indicating a distance between the hair particle and the specified reference point / 801

Generating a hair layer identifier of the hair layer based on the hair layer number, and associating the hair layer identifier with the hair particle / 802

Performing a prefix sum processing based on the hair layer identifier corresponding to the hair particles in the hair layer in the hair particle model to obtain the number of the hair particles in the hair layer / 804

FIG. 8

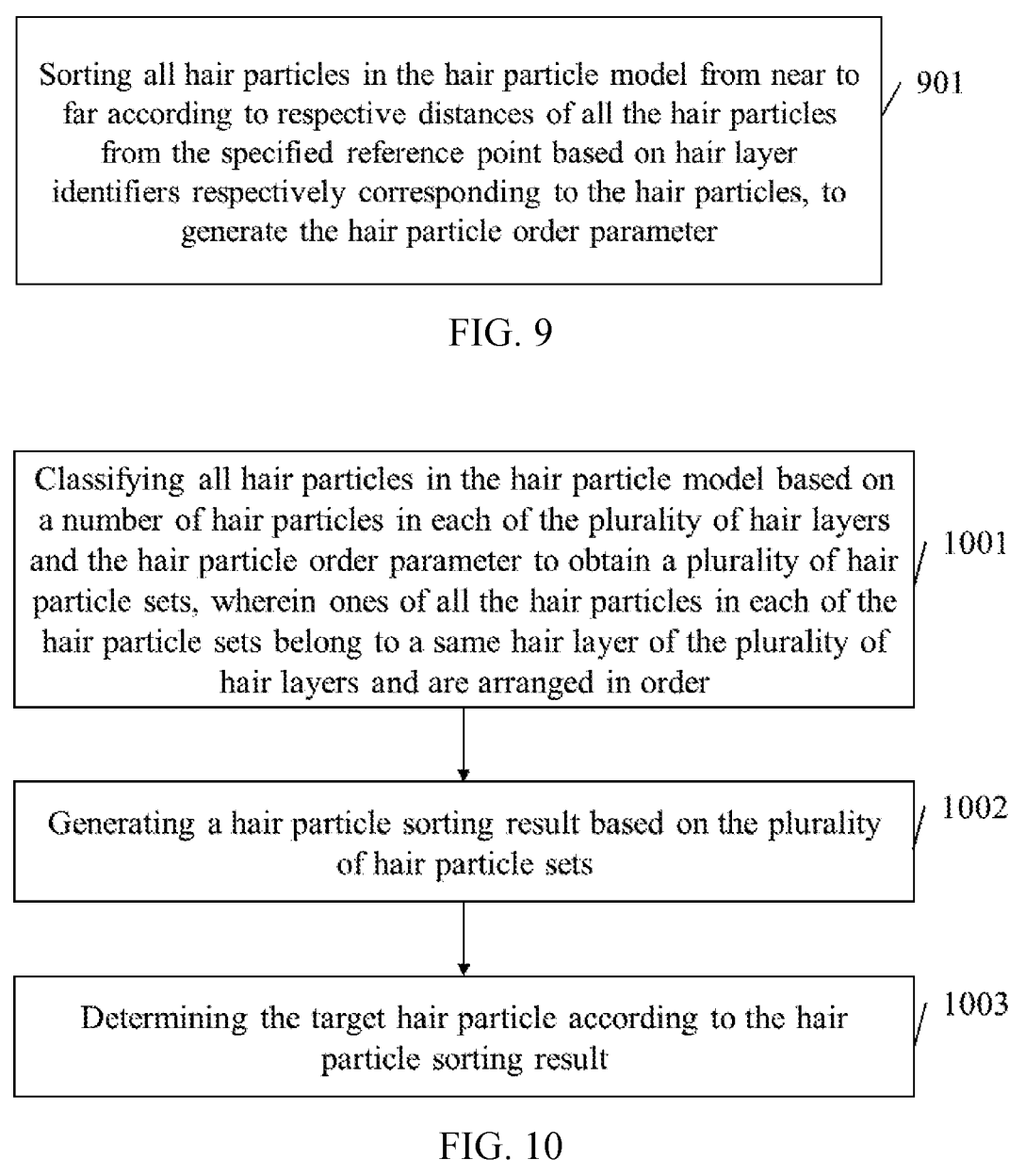

Sorting all hair particles in the hair particle model from near to far according to respective distances of all the hair particles from the specified reference point based on hair layer identifiers respectively corresponding to the hair particles, to generate the hair particle order parameter    / 901

FIG. 9

Classifying all hair particles in the hair particle model based on a number of hair particles in each of the plurality of hair layers and the hair particle order parameter to obtain a plurality of hair particle sets, wherein ones of all the hair particles in each of the hair particle sets belong to a same hair layer of the plurality of hair layers and are arranged in order    / 1001

Generating a hair particle sorting result based on the plurality of hair particle sets    / 1002

Determining the target hair particle according to the hair particle sorting result    / 1003

FIG. 10

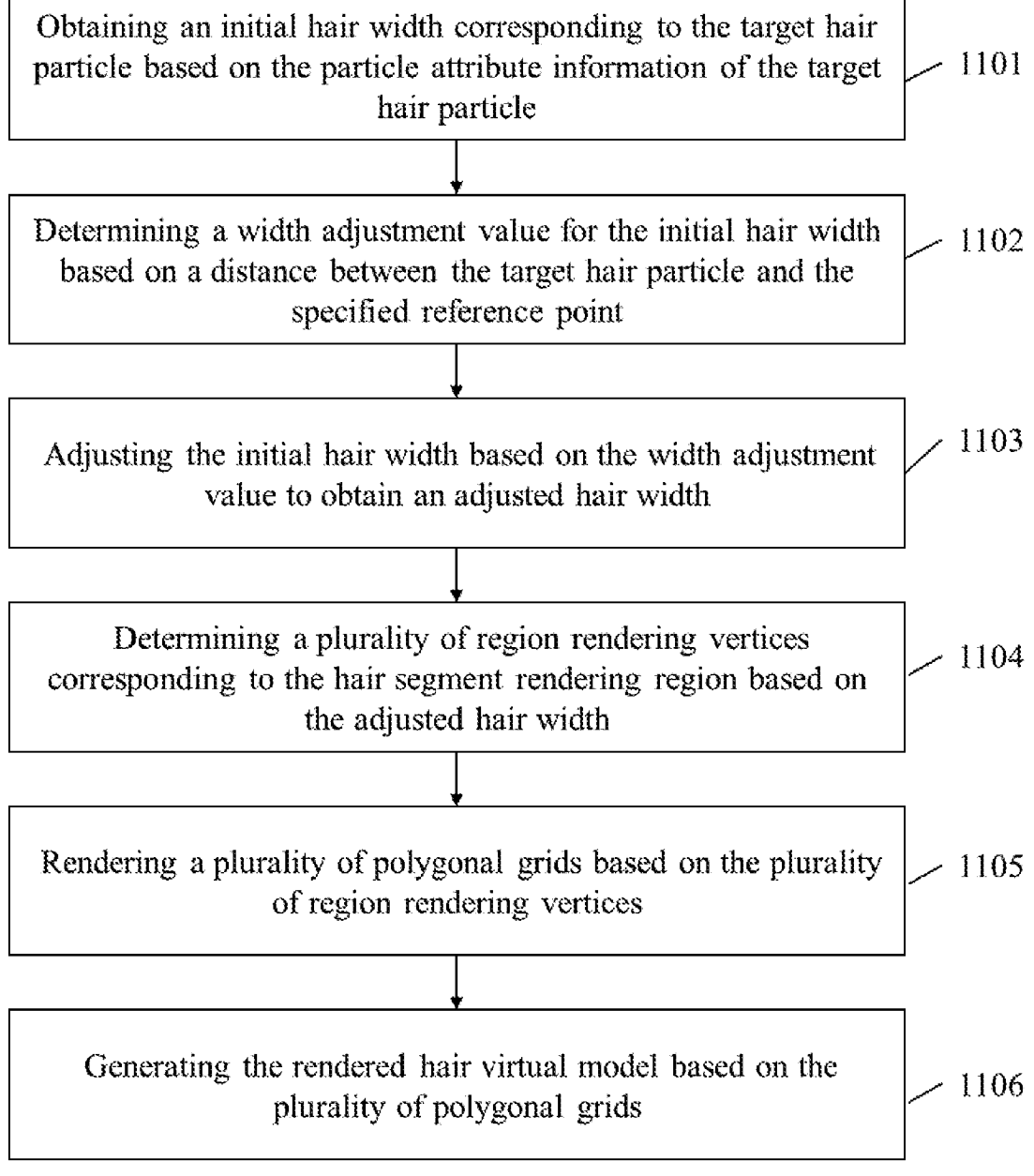

Obtaining an initial hair width corresponding to the target hair particle based on the particle attribute information of the target hair particle                    — 1101

Determining a width adjustment value for the initial hair width based on a distance between the target hair particle and the specified reference point                    — 1102

Adjusting the initial hair width based on the width adjustment value to obtain an adjusted hair width                    — 1103

Determining a plurality of region rendering vertices corresponding to the hair segment rendering region based on the adjusted hair width                    — 1104

Rendering a plurality of polygonal grids based on the plurality of region rendering vertices                    — 1105

Generating the rendered hair virtual model based on the plurality of polygonal grids                    — 1106

FIG. 11

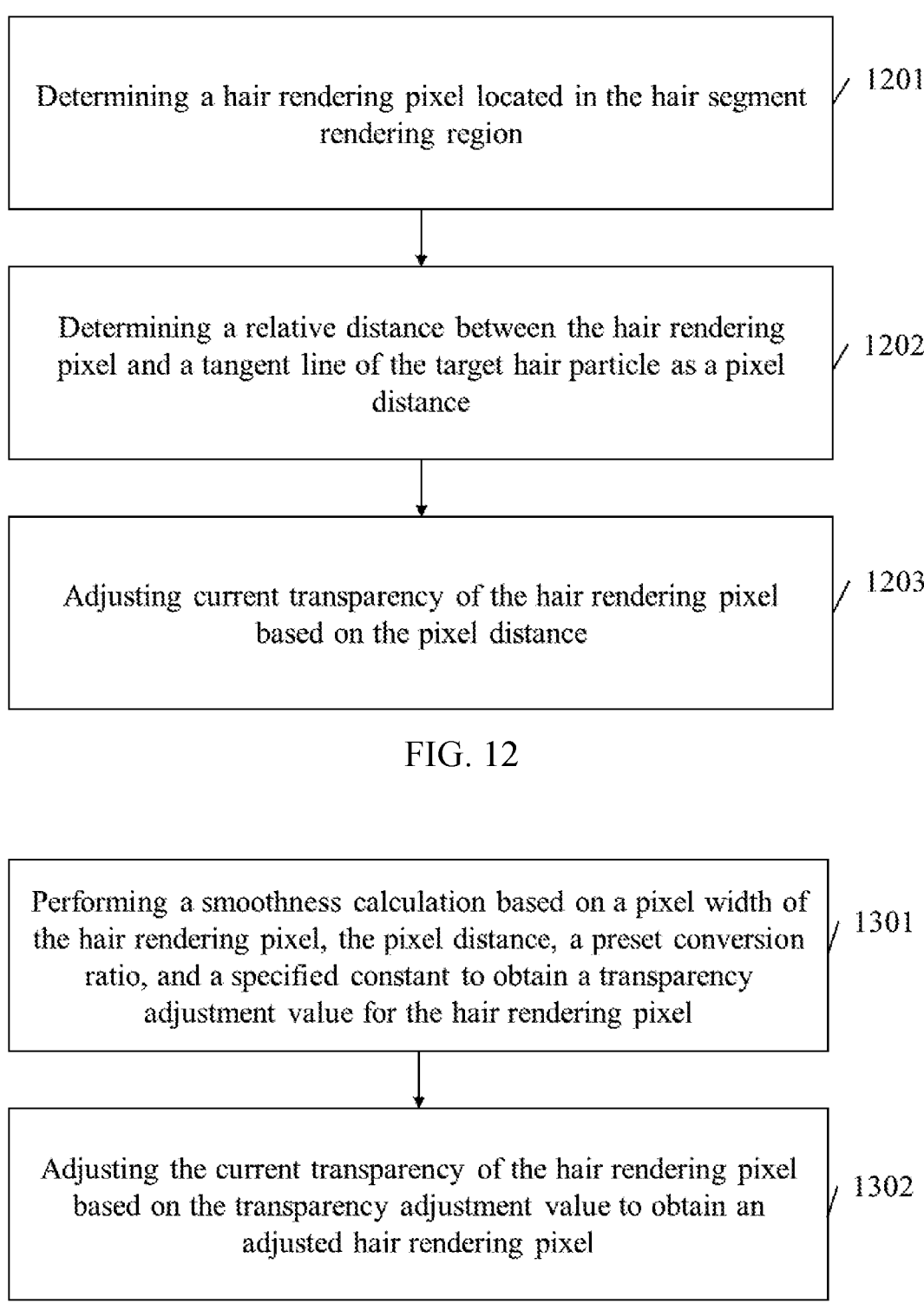

Determining a hair rendering pixel located in the hair segment rendering region — 1201

Determining a relative distance between the hair rendering pixel and a tangent line of the target hair particle as a pixel distance — 1202

Adjusting current transparency of the hair rendering pixel based on the pixel distance — 1203

FIG. 12

Performing a smoothness calculation based on a pixel width of the hair rendering pixel, the pixel distance, a preset conversion ratio, and a specified constant to obtain a transparency adjustment value for the hair rendering pixel — 1301

Adjusting the current transparency of the hair rendering pixel based on the transparency adjustment value to obtain an adjusted hair rendering pixel — 1302

FIG. 13

METHODS AND APPARATUSES FOR RENDERING A HAIR VIRTUAL MODEL, COMPUTER DEVICES, AND STORAGE MEDIA

CROSS REFERENCE TO RELATED APPLICATIONS

The present disclosure is a US national phase Application of International Application No. PCT/CN2022/119162, filed on Sep. 15, 2022, which is based upon and claims priority to Chinese Patent Application No. 202210488443.4, filed on May 6, 2022. The disclosures of the above applications are incorporated herein by reference in their entireties for all purposes.

TECHNICAL FIELD

The present disclosure relates to computer image processing technologies of a computer, and more particularly, to methods and apparatuses for rendering a hair virtual model, computer devices, and storage media.

BACKGROUND

With the continuous development of computer communication technology and wide popularization and application of terminals such as smartphones, tablets, and notebook computers, the terminals are developed in a diversified and personalized direction and gradually becoming indispensable terminals for people in life and work. To satisfy people's pursuit of spiritual life, entertainment games capable of operating on the terminals are emerging and more terminal games are emerging. The terminal games have become indispensable living and entertainment ways. For a user to obtain a better game experience, many terminal games are often constructed based on real characters and scenes. Therefore, during a game design, a game scene in a game design is expected to be closer to a real situation.

In game design projects, it is common to simulate human characters and animal characters, for example, to simulate hair of the human characters and hair of the animal characters. During hair simulation, to ensure that the hair can be displayed normally and avoid a display disorder of the hair due to change in a viewing angle of a game, the hair is usually rendered in a semi-transparent sorting manner and an anti-aliasing effect is realized, which may cause rapidly increasing occupation of a video memory of a computer device and thus result in inefficiency in hair rendering.

SUMMARY

The present disclosure provides methods, apparatuses, and storage medium for rendering a hair virtual model.

In a first aspect, the present disclosure provides a method for rendering a hair virtual model, including:

obtaining, by a terminal, particle attribute information of a hair particle in a hair particle model, wherein the hair particle model simulates a target hair rendering effect;

obtaining, by the terminal, a hair particle order parameter corresponding to the hair particle model, wherein the hair particle order parameter indicates an order of a respective distance of each hair particle in the hair particle model from a specified reference point in a model space of the hair particle model;

based on the hair particle order parameter, determining a target hair particle of the hair particle in the hair particle model for rendering; and obtaining, by the terminal, a rendered hair virtual model for the target hair particle by determining a hair segment rendering region based on the particle attribute information of the target hair particle and rendering the hair segment rendering region.

In a second aspect, the present disclosure further provides a computer device, including a processor and a memory storing a computer program and a processor, wherein when calling the computer program in the memory, executable by the processor to perform the method for rendering the hair virtual model.

In a third aspect, the present disclosure further provides a non-transitory computer-readable storage medium storing a computer program, and when executed by a processor, the computer program implements the method for rendering the hair virtual model.

BRIEF DESCRIPTION OF THE DRAWINGS

FIG. 1 is a schematic flowchart of a method for rendering a hair virtual model according to one or more embodiments of the present disclosure.

FIG. 5 is a schematic flowchart of a method for determining target hair particles according to one or more embodiments of the present disclosure.

FIG. 6 is a schematic flowchart of a method for determining a number of hair particles in each of hair layers of a hair particle model and a hair particle order parameter according to one or more embodiments of the present disclosure.

FIG. 7 is a schematic flowchart of a method for layering a model space of a hair particle model according to one or more embodiments of the present disclosure.

FIG. 8 is a schematic flowchart of a method for determining respective hair layer numbers of hair layers of a hair particle model according to one or more embodiments of the present disclosure.

FIG. 9 is a schematic flowchart of a method for determining a hair particle order parameter according to one or more embodiments of the present disclosure.

FIG. 10 is a schematic flowchart of another method for determining target hair particles according to one or more embodiments of the present disclosure.

FIG. 11 is a schematic flowchart of a method for obtaining a rendered hair virtual model according to one or more embodiments of the present disclosure.

FIG. 12 is a schematic flowchart of a method for adjusting a transparency of a hair rendering pixels located in a hair segment rendering region corresponding to each target hair particle according to one or more embodiments of the present disclosure.

FIG. 13 is a schematic flowchart of a method for adjusting a transparency of a hair rendering pixel based on a pixel distance according to one or more embodiments of the present disclosure.

DETAILED DESCRIPTION

Figure 2:
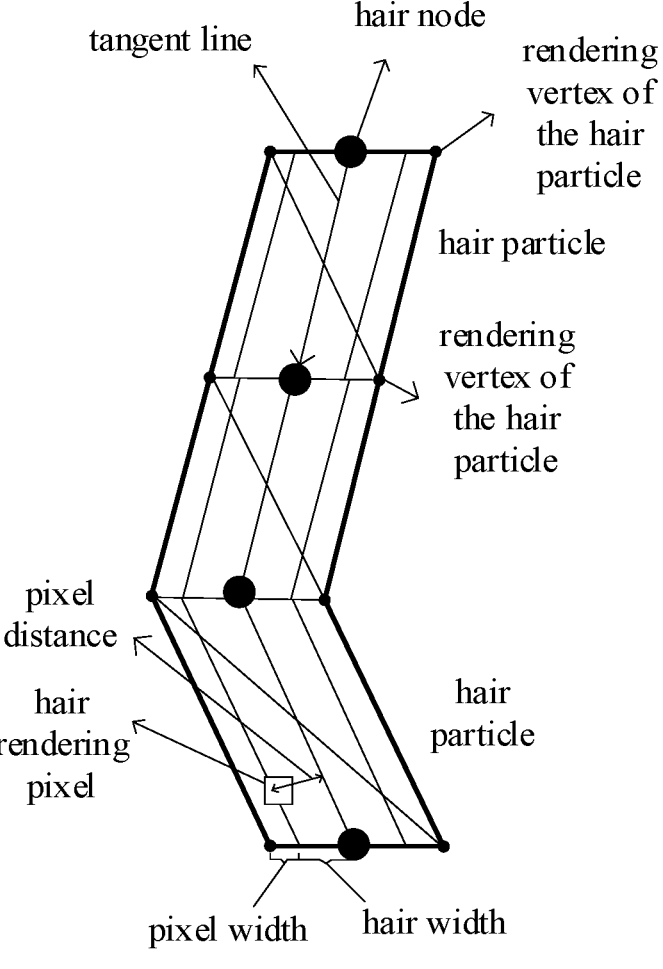
FIG. 2 is a schematic diagram illustrating an application scenario of the method for rendering a hair virtual model according to one or more embodiments of the present disclosure.

Some embodiments of the present disclosure will be described in detail below in connection with the accompanying drawings. The embodiments are described for illustrative purposes only and are not intended to limit the present disclosure.

Some embodiments of the present disclosure provide methods and apparatuses for rendering a hair virtual model, computer devices, and storage media. Specifically, the methods for rendering the hair virtual model of the embodiments of the present disclosure may be performed by a computer device, which may be a terminal device. The terminal may be a smartphone, a tablet computer, a notebook computer, a touch screen, a game machine, a Personal Computer (PC), a Personal Digital Assistant (PDA), or the like.

For example, when the methods for rendering the hair virtual model is run on the terminal device, the terminal device provides a graphical user interface to a user through a plurality of ways. For example, the graphical user interface may be rendered for display on a display screen of the terminal device, or may be presented by holographic projection. For example, the terminal device may include a touch screen and a processor. The touch screen may be configured to display the graphical user interface and to receive operation instructions generated by the user acting on the graphical user interface. The graphical user interface includes a display screen. The processor is configured to generate the graphical user interface, respond to the operation instruction, and control a display of the graphical user interface on the touch display.

Some embodiments of the present disclosure provide methods and apparatuses for rendering a hair virtual model, computer devices, and storage media, which will be described in detail below. It should be noted that the order in which the following embodiments are described is not intended to limit a preferred order of the embodiments.

Referring to FIG. 1, FIG. 1 is a schematic flowchart of a method for rendering a hair virtual model according to one or more embodiments of the present disclosure. A specific flow may be operations 101 to 104 as follows.

In operation 101, particle attribute information of a hair particle in a hair particle model is obtained by a terminal. The hair particle model simulates a target hair rendering effect.

In the embodiments of the present disclosure, the particle attribute information includes a location of the hair particle in a model space and a tangential attribute of the hair particle.

In operation 102, a hair particle order parameter corresponding to the hair particle model is obtained by the terminal. The hair particle order parameter indicates an order of respective distances of hair particles from a specified reference point in a model space of the hair particle model.

In an embodiment, referring to FIG. 5, after the operation of obtaining the hair particle order parameter corresponding to the hair particle model, the method further includes:

obtaining a number of hair particles in a hair layer corresponding to the hair particle model, wherein the number of hair particles in the hair layer indicates a number of hair particles in the hair layer of the hair particle model, and the hair layer is obtained by layering the model space of the hair particle model based on the specified reference point; and determining the target hair particle based on the number of hair particles in the hair layer and the hair particle order parameter.

In another embodiment, before the operation of obtaining the hair particle order parameter corresponding to the hair particle model, the method further includes:

layering the model space based on a relative distance between the hair particle model and the specified reference point and a specified coordinate axis of the model space, to obtain a plurality of hair layers and a total number of the plurality of hair layers;

determining a hair layer number of the hair layer where the hair particles are located in the hair particle model based on the relative distance and the total number of the plurality of hair layers; and determining the number of the hair layer particles in the hair layer and the hair particle order parameter based on the hair layer number of the hair layer.

Specifically, the operation of layering the model space based on the relative distance between the hair particle model and the specified reference point and the specified coordinate axis of the model space, to obtain the plurality of hair layers and the total number of the plurality of hair layers, the method may include:

determining a first distance and a second distance between the hair particle model and the specified reference point in the model space, wherein the first distance indicates a minimum distance between the hair particle model and the specified reference point and the second distance indicates a maximum distance between the hair particle model and the specified reference point; and layering the model space based on the first distance, the second distance, and the specified coordinate axis of the model space to obtain the hair layers and the total number of the plurality of hair layers.

Further, referring to FIG. 8, after the operation of layering the model space based on the first distance, the second distance, and the specified coordinate axis of the model space to obtain the plurality of hair layers and the total number of the plurality of hair layers, the method may include:

determining the hair layer number of the hair layer where the hair particles are located based on the first distance, the second distance, and a target distance corresponding to the hair particle indicating a distance between the hair particle and the specified reference point.

Determining the number of hair particles in the hair layer may include: generating a hair layer identifier of the hair layer based on the hair layer number, and associating the hair layer identifier with the hair particle; and performing a prefix sum processing based on the hair layer identifier corresponding to the hair particles in the hair layer in the hair particle model to obtain the number of the hair particles in the hair layer.

In another embodiment, referring to FIG. 9, after the operation of layering the model space based on the first distance, the second distance, and the specified coordinate axis of the model space to obtain the plurality of hair layers and the total number of the plurality of hair layers, the method may include:

sorting all hair particles in the hair particle model from near to far according to respective distances of the hair particles from the specified reference point based on the hair layer identifiers respectively corresponding to the hair particles, to generate the hair particle order parameter.

In some examples, in one or more embodiments of the present disclosure, referring to FIG. 10, all the hair particles in the hair particle model may be classified based on the number of hair particles in each of the plurality of hair layers and the hair particle order parameter to obtain a plurality of hair particle sets. Ones of all the hair particles in each of the hair particle sets belong to a same hair layer of the plurality of hair layers and are arranged in order. A hair particle sorting result may be generated based on the plurality of hair particle sets. The target hair particle may be determined according to the hair particle sorting result.

In operation 103, a target hair particle of the hair particle is determined based on the hair particle order parameter.

In operation 104, a rendered hair virtual model for the target hair particle is obtained by the terminal by determining a hair segment rendering region based on the particle attribute information of the target hair particle and rendering the hair segment rendering region.

In order to make target hair more realistic, referring to FIG. 11, the operation of obtaining the rendered hair virtual model by determining the hair segment rendering region based on the particle attribute information of the target hair particle and rendering the hair segment rendering region includes:

obtaining an initial hair width corresponding to the target hair particle based on the particle attribute information of the target hair particle;

determining a width adjustment value for the initial hair width based on a distance between the target hair particle and the specified reference point;

adjusting the initial hair width based on the width adjustment value to obtain an adjusted hair width;

determining a plurality of region rendering vertices corresponding to the hair segment rendering region based on the adjusted hair width; and rendering a plurality of polygonal grids based on the plurality of region rendering vertices; and generating the rendered hair virtual model based on the plurality of polygonal grids.

Further, referring to FIG. 12, after the operation of generating the hair virtual model based on the plurality of polygonal grids, the method may include:

determining a hair rendering pixel located in the hair segment rendering region;

determining a relative distance between the hair rendering pixel and a tangent line of the target hair particle—the tangent line as a pixel distance; and adjusting current transparency of the hair rendering pixel based on the pixel distance.

In order to improve an anti-aliasing effect of the target hair, referring to FIG. 13, the operation of adjusting the current transparency of the hair rendering pixels based on the pixel distance may include:

performing a smoothness calculation based on a pixel width of the hair rendering pixel, the pixel distance, a preset conversion ratio, and a specified constant to obtain a transparency adjustment value for the hair rendering pixel; and adjusting the current transparency of the hair rendering pixel based on the transparency adjustment value to obtain an adjusted hair rendering pixel.

In a summary, the embodiments of the present disclosure provide method for rendering a hair virtual model. On one hand, the method includes: obtaining particle attribute information of a hair particle in a hair particle model, wherein the hair particle model simulates a target hair rendering effect; obtaining a hair particle order parameter corresponding to the hair particle model; determining, based on the hair particle order parameter, a target hair particle of the hair particle in the hair particle model for rendering; and obtaining a rendered hair virtual model for the target hair particle by determining a hair segment rendering region based on the particle attribute information of the target hair particle and rendering the hair segment rendering region. By generating the hair particle model through simulation, splitting hair into hair particles, and renders the hair particles, a semi-transparent effect of the target hair is achieved accurately. Moreover, since according to the embodiments of the present disclosure, there is no need to create a linked list for each pixel, computing resource consumption of the hair rendering is reduced, thereby reducing video memory occupancy of a computer device and improves hair rendering efficiency. On the other hand, the embodiments of the present disclosure may further expand each hair particle along a direction perpendicular to a tangent line of hair. By adjusting a pixel distance at a hair edge to adjust current transparency of a hair rendering pixel, it is possible to improve colour relaxation and an anti-aliasing effect of the hair during hair rendering, thereby improving authenticity of the target hair.

Specifically, some embodiments of the present disclosure further provide a specific application method for rendering a hair virtual model. The specific method may be as follows.

(1) A minimum distance Min and a maximum distance Max of the hair particles in the hair particle model from a virtual camera (i.e., the specified reference point) can be estimated at a Central Processing Unit (CPU) end. Then, a model space between the minimum distance Min and the maximum distance Max is divided into a specified number of divisions (LayerCount) of hair layers (Layer). Thereafter, the hair particles are placed in different Layers according to a distance between each of the hair particles and the specified reference point to achieve approximate ordering. In some embodiments of the present disclosure, the specified number of divisions may be 1024, 2048, etc., and may be adjusted according to actual conditions. For example, the minimum distance Min and the maximum distance Max of the hair particle model may be calculated to be 20 cm and 40 cm, respectively. In some embodiments of the present disclosure, the model space between 20 cm and 40 cm may be divided into 1024 hair layers, (40–20)/1024 cm is a thickness of each hair layer, and each hair layer represents a distance interval.

(2) An empty Buffer for storing data as LayerCount may be constructed at a GPU end and the empty Buffer is named as CounterBuffer. The CounterBuffer is used to store a number of hair particles in each hair layer. Further, it is also possible to construct, at the GPU end, a Buffer having a length of a total number (ParticleCount) of hair particles in the hair particle model, and name the Buffer as RenderKeyBuffer. The RenderKeyBuffer is used to record hair particle identifiers whose distance from the specified reference point is from near to far.

(3) A position Xi of a hair particle i in the model space can be read in parallel at the GPU side, and a distance between the hair particle and the virtual camera is calculated, and then the a hair layer number corresponding to the hair particle is calculated according to a hair particle identifier calculation formula as below, and then an atom of Counter-Buffer[LayerId] is incremented by one.

$$\text{Hair layer number} = \frac{(dis - \min)}{\max - \min} \times \text{Specified number of divisions,}$$

where dis is a distance between the hair particle and the virtual camera, min is the minimum distance of the hair particle from the virtual camera (i.e., the specified reference point), and max is the maximum distance of the hair particle from the virtual camera (i.e., the specified reference point).

(4) After the hair layer number corresponding to each hair particle in the hair particle model is obtained, parallel prefix sum calculation is performed on the CounterBuffer at the GPU end to obtain a total number of hair particles in each hair layer.

(5) After the hair layer number corresponding to each hair particle in the hair particle model is obtained, [LayerId] in the CounterBuffer is recorded as WritingPoint, and the atom of the CounterBuffer[LayerId] is incremented by one. When RenderKeyBuffer[WritingPoint] is set to i, Ids of HairParticle from near to far are stored in the RenderKeyBuffer.

(6) Referring to FIG. 2, in a VertexShader, a target hair particle in the RenderKeyBuffer, which actually needs to be rendered, is read based on a rendered hair identifier, and a position of each rendering vertex of the target hair particle is obtained based on a position of the target hair particle in the model space and a tangential attribute of the target hair particle. Then, in the VertexShader, based on a distance of the target hair particle from the virtual camera, the position of each rendering vertex of the target hair particle is determined to correspond to a PixelWidth. A target width of the target hair particle is obtained by adding a hair width and the PixelWidth.

(7) In a PixelShader, the PixelWidth and a PixelDistance are determined, respectively. A coverage degree of the hair on a current pixel is calculated according to a smoothness calculation formula to calculate a transparency value (Alpha) of the current pixel. Finally, Alpha mixing is performed on pixels through GPU hardware.

$$\text{Smoothstep(0,1,PixelWidth-lengthtopixel} \times \text{(PixelDistance)+0.5)},$$

where LenghtToPixel is a conversion ratio of a world space length to a pixel space length under a current depth, and 0.5 is an empirical value, which can be replaced according to actual situations.

Specifically, for y=smoothstep (0, 1, x), the above [PixelWidth-lengthtopixel×(PixelDistance)+0.5] is replaced with x. If x is calculated to be less than 0, a smoothness value is 0; if x is calculated to be greater than or equal to 0 or less than or equal to 1, the smoothness value is $3x^2-2x^3$; if x is calculated to be greater than 1, the smoothness value is 1, so that the smoothness value smoothly transitions from "0" to "1", thereby realizing a smooth transition.

To facilitate better implementation of the method for rendering the hair virtual model of the embodiments of the present disclosure, some embodiments of the present disclosure further provide an apparatus for rendering a hair virtual model, wherein meanings of nouns are the same as in the above-mentioned method for rendering the hair virtual model. Specific implementation details may be referred to the description in the method embodiments.

Figure 3:
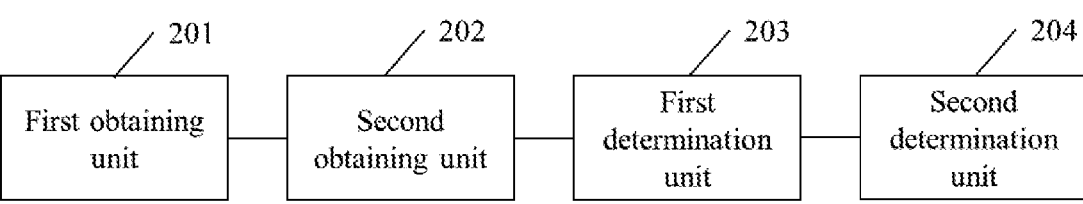
FIG. 3 is a schematic block diagram of an apparatus for rendering a hair virtual model according to one or more embodiments of the present disclosure.

Referring to FIG. 3, FIG. 3 is a schematic block diagram of an apparatus for rendering a hair virtual model according to one or more embodiments of the present disclosure. The apparatus includes:

a first obtaining unit 201 configured to obtain particle attribute information of a hair particle in a hair particle model, wherein the hair particle model simulates a target hair rendering effect;

a second obtaining unit 202 configured to obtain a hair particle order parameter corresponding to the hair particle model, wherein the hair particle order parameter indicates an order of a respective distance of each hair particle in the hair particle model from a specified reference point in a model space of the hair particle model;

a first determination unit 203 configured to, based on the hair particle order parameter, determine a target hair particle of the hair particle in the hair particle model for rendering; and a second determination unit 204 configured to obtain a rendered hair virtual model for the target hair particle by determining a hair segment rendering region based on the particle attribute information of the target hair particle and rendering the hair segment rendering region.

In some embodiments, the apparatus further includes:

a first obtaining subunit configured to obtain a number of hair particles in a hair layer corresponding to the hair particle model, wherein the number of hair particles in the hair layer indicates a number of hair particles in the hair layer of the hair particle model, and the hair layer is obtained by layering the model space of the hair particle model based on the specified reference point; and a first determination subunit configured to determine the target hair particle based on the number of hair particles in the hair layer and the hair particle order parameter.

In some embodiments, the apparatus further includes:

a first processing unit configured to layer the model space based on a relative distance between the hair particle model and the specified reference point and a specified coordinate axis of the model space, to obtain a plurality of hair layers and a total number of the plurality of hair layers;

a second determination subunit configured to determine a hair layer number of the hair layer where the hair particles are located in the hair particle model based on the relative distance and the total number of the plurality of hair layers; and the second determination subunit configured to determine the number of the hair particles in the hair layer and the hair particle order parameter based on the hair layer number of the hair layer.

In some embodiments, the apparatus further includes:

a third determination subunit configured to determine a first distance and a second distance between the hair particle model and the specified reference point in the model space, wherein the first distance indicates a minimum distance between the hair particle model and the specified reference point and the second distance indicates a maximum distance between the hair particle model and the specified reference point; and a second processing unit configured to layer the model space based on the first distance, the second distance, and the specified coordinate axis of the model space to obtain the plurality of hair layers and the total number of the plurality of hair layers.

In some embodiments, the apparatus further includes:

a fourth determination subunit configured to determine the hair layer number of the hair layer where the hair particles are located based on the first distance, the second distance, and a target distance corresponding to the hair particle indicating a distance between the hair particle and the specified reference point;

an association unit configured to generate a hair layer identifier of the hair layer based on the hair layer number, and associate the hair layer identifier with the hair particle; and a third processing unit configured to perform a prefix sum processing based on the hair layer identifier corresponding to the hair particles in the hair layer in the hair particle model to obtain the number of the hair particles in the hair layer.

In some embodiments, the apparatus further includes:

a first generation unit configured to sort all hair particles in the hair particle model from near to far according to the respective distances of the hair particles from the specified reference point based on the hair layer identifiers respectively corresponding to the hair particles, to generate the hair particle order parameter.

In some embodiments, the apparatus further includes:

a fourth processing unit configured to classify all the hair particles in the hair particle model based on a number of hair particles in each of the plurality of hair layers and the hair particle order parameter to obtain a plurality of hair particle sets, wherein ones of all the hair particles in each of the hair particle sets belong to a same hair layer of the plurality of hair layers and are arranged in order;

a second generation unit configured to generate a hair particle sorting result based on the plurality of hair particle sets; and a fifth determination subunit configured to determine the target hair particle according to the hair particle sorting result.

In some embodiments, the apparatus further includes:

a second obtaining subunit configured to obtain an initial hair width corresponding to the target hair particle based on the particle attribute information of the target hair particle;

a sixth determination subunit configured to determine a width adjustment value for the initial hair width based on a distance between the target hair particle and the specified reference point;

a first adjustment unit configured to adjust the initial hair width based on the width adjustment value to obtain an adjusted hair width;

a sixth determination subunit configured to determine a plurality of region rendering vertices corresponding to the hair segment rendering region based on the adjusted hair width;

a rendering unit configured to render a plurality of polygonal grids based on the plurality of region rendering vertices; and a third generation unit configured to generate the hair virtual model based on the plurality of polygonal grids.

In some embodiments, the apparatus further includes:

a seventh determination subunit configured to determine a hair rendering pixel located in the hair segment rendering region;

the seventh determination subunit configured to determine a relative distance between the hair rendering pixel and a tangent line of the target hair particle as a pixel distance; and a second adjustment unit configured to adjust current transparency of the hair rendering pixel based on the pixel distance.

In some embodiments, the apparatus further includes:

a calculation unit configured to perform a smoothness calculation based on a pixel width of the hair rendering pixel, the pixel distance, a preset conversion ratio, and a specified constant to obtain a transparency adjustment value for the hair rendering pixel; and a third adjustment unit configured to adjust the current transparency of the hair rendering pixel based on the transparency adjustment value to obtain an adjusted hair rendering pixel.

Some embodiments of the present disclosure provides an apparatus for rendering a hair virtual model, wherein: a first obtaining unit 201 obtains particle attribute information of a hair particle in a hair particle model, wherein the hair particle model simulates a target hair rendering effect; a second obtaining unit 202 obtains a hair particle order parameter corresponding to the hair particle model, wherein the hair particle order parameter indicates an order of a respective distance of each hair particle from a specified reference point in a model space of the hair particle model; a first determination unit 203, based on the hair particle order parameter, determines a target hair particle of the hair particle in the hair particle model for rendering; and a second determination unit obtains a rendered hair virtual model by determining a hair segment rendering region for the target hair particle based on the particle attribute information of the target hair particle and rendering the hair segment rendering region. On one hand, the embodiments of the present invention generate the hair particle model through simulation, split hair into hair particles, and render the hair particles, which achieves a semi-transparent effect of the target hair, reduces video memory occupancy of a computer device, and improves hair rendering efficiency. On the other hand, the embodiments of the present disclosure may further expand each hair particle along a direction perpendicular to a tangent line of hair. By adjusting a pixel distance at a hair edge to adjust current transparency of a hair rendering pixel, it is possible to improve colour relaxation and an anti-aliasing effect of the hair during hair rendering, thereby improving authenticity of the target hair.

Figure 4:
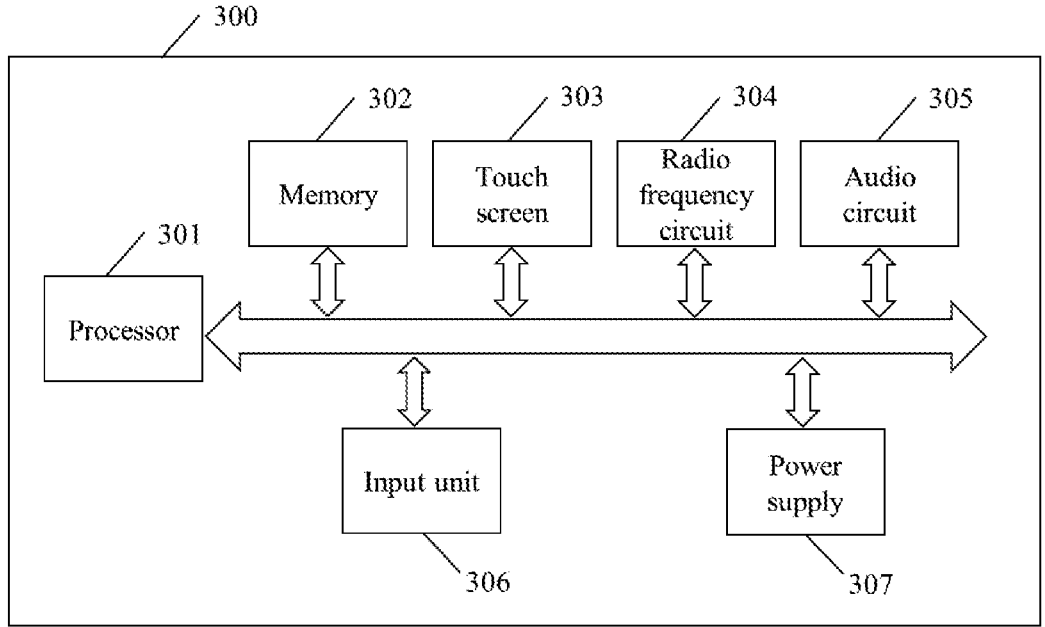
FIG. 4 is a schematic block diagram of a computer device according to one or more embodiments of the present disclosure.

Accordingly, some embodiments of the present disclosure further provide a computer device. The computer device may be a terminal or a server. The terminal may be a smartphone, a tablet computer, a notebook computer, a touch screen, a game machine, a Personal Computer (PC), a Personal Digital Assistant (PDA), or the like. As shown in FIG. 4, FIG. 4 is a schematic structural diagram of a computer device according to one or more embodiments of the present disclosure. The computer device 300 includes a processor 301 having one or more processing cores, a memory 302 having one or more computer-readable storage media, and a computer program stored on the memory 302 and operable on the processor. The processor 301 is electrically connected to the memory 302. It will be appreciated by those skilled in the art that the computer device structure shown in drawings does not constitute a limitation on the computer device, and may include more or fewer components than illustrated, or may combine some components, or has different component arrangements.

The processor 301 is a control centre of the computer device 300, connects various parts of the computer device 300 by various interfaces and lines, and performs various functions of the computer device 300 and processes data by running or loading software programs and/or modules stored in the memory 302 and invoking data stored in the memory 302, thereby monitoring the computer device 300 as a whole.

In some embodiments of the present disclosure, the processor 301 in the computer device 300 loads instructions corresponding to processes of one or more application programs into the memory 302 according to the following operations, and runs the application programs stored in the memory 302 to implement various functions:

obtaining particle attribute information of a hair particle in a hair particle model, wherein the hair particle model simulates a target hair rendering effect;

obtaining a hair particle order parameter corresponding to the hair particle model, wherein the hair particle order parameter indicates an order of a respective distance of each hair particle in the hair particle model from a specified reference point in a model space of the hair particle model;

based on the hair particle order parameter, determine a target hair particle of the hair particle in the hair particle model for rendering; and obtaining a rendered hair virtual model for the target hair particle by determining a hair segment rendering region based on the particle attribute information of the target hair particle and rendering the hair segment rendering region.

In some examples, after obtaining the hair particle order parameter corresponding to the hair particle model, the method further includes:

obtaining a number of hair particles in a hair layer corresponding to the hair particle model, wherein the number of hair particles in the hair layer indicates a number of hair particles in the hair layer of the hair particle model, and the hair layer is obtained by layering the model space of the hair particle model based on the specified reference point; and determining the target hair particle based on the number of hair particles in the hair layer and the hair particle order parameter.

In some examples, before obtaining the hair particle order parameter corresponding to the hair particle model, the method further includes:

layering the model space based on a relative distance between the hair particle model and the specified reference point and a specified coordinate axis of the model space, to obtain a plurality of hair layers and a total number of the plurality of hair layers;

determining a hair layer number of the hair layer where the hair particles are located in the hair particle model based on the relative distance and the total number of the plurality of hair layers; and determining the number of the hair particles in the hair layer and the hair particle order parameter based on the hair layer number of the hair layer.

In some examples, the layering the model space based on the relative distance between the hair particle model and the specified reference point and the specified coordinate axis of the model space, to obtain the plurality of hair layers and the total number of the plurality of hair layers includes:

determining a first distance and a second distance between the hair particle model and the specified reference point in the model space, wherein the first distance indicates a minimum distance between the hair particle model and the specified reference point and the second distance indicates a maximum distance between the hair particle model and the specified reference point; and layering the model space based on the first distance, the second distance, and the specified coordinate axis of the model space to obtain the plurality of hair layers and the total number of the plurality of hair layers.

In some examples, after layering the model space based on the first distance, the second distance, and the specified coordinate axis of the model space to obtain the plurality of hair layers and the total number of the plurality of hair layers, the method includes:

determining the hair layer number of the hair layer where the hair particles are located based on the first distance, the second distance, and a target distance corresponding to the hair particle indicating a distance between the hair particle and the specified reference point;

generating a hair layer identifier of the hair layer based on the hair layer number, and associating the hair layer identifier with the hair particle; and performing a prefix sum processing based on the hair layer identifier corresponding to the hair particles in the hair layer in the hair particle model to obtain the number of the hair particles in the hair layer.

In some examples, after layering the model space based on the first distance, the second distance, and the specified coordinate axis of the model space to obtain the plurality of hair layers and the total number of the plurality of hair layers, the method further includes:

sorting all hair particles in the hair particle model from near to far according to the respective distances of the hair particles from the specified reference point based on the hair layer identifiers respectively corresponding to the hair particles, to generate the hair particle order parameter.

In some examples, the method further includes:

classifying all the hair particles in the hair particle model based on a number of hair particles in each of the plurality of hair layers and the hair particle order parameter to obtain a plurality of hair particle sets, wherein ones of all the hair particles in each of the hair particle sets belong to a same hair layer of the plurality of hair layers and are arranged in order;

generating a hair particle sorting result based on the plurality of hair particle sets; and determining the target hair particle according to the hair particle sorting result.

In some examples, obtaining the rendered hair virtual model by determining the hair segment rendering region based on the particle attribute information of the target hair particle and rendering the hair segment rendering region includes:

obtaining an initial hair width corresponding to the target hair particle based on the particle attribute information of the target hair particle;

determining a width adjustment value for the initial hair width based on a distance between the target hair particle and the specified reference point;

adjusting the initial hair width based on the width adjustment value to obtain an adjusted hair width;

determining a plurality of region rendering vertices corresponding to the hair segment rendering region based on the adjusted hair width;

rendering a plurality of polygonal grids based on the plurality of region rendering vertices; and generating the hair virtual model based on the plurality of polygon grids.

In some examples, after generating the hair virtual model based on the plurality of polygonal grids, the method further includes:

determining a hair rendering pixel located in the hair segment rendering region;

determining a relative distance between the hair rendering pixel and a tangent line of the target hair particle as a pixel distance; and adjusting current transparency of the hair rendering pixel based on the pixel distance.

In some examples, the adjusting of the current transparency of the hair rendering pixel based on the pixel distance includes:

performing a smoothness calculation based on a pixel width of the hair rendering pixel, the pixel distance, a preset conversion ratio, and a specified constant to obtain a transparency adjustment value for the hair rendering pixel; and adjusting the current transparency of the hair rendering pixel based on the transparency adjustment value to obtain an adjusted hair rendering pixel.

Some embodiments of the present disclosure provide methods and apparatuses for rendering a hair virtual model, computer devices, and storage media, which: obtain particle attribute information of a hair particle in a hair particle model, wherein the hair particle model simulates a target hair rendering effect; obtain a hair particle order parameter corresponding to the hair particle model, wherein the hair particle order parameter indicates an order of a respective distance of each hair particle in the hair particle model from a specified reference point in a model space of the hair particle model; based on the hair particle order parameter, determine a target hair particle of the hair particle in the hair particle model for rendering; and finally obtain a rendered hair virtual model for the target hair particle by determining a hair segment rendering region based on the particle attribute information of the target hair particle and rendering the hair segment rendering region. The embodiments of the present disclosure generate a hair particle model through simulation, and split hair into hair particles, and rendering the hair particles, which reduces video memory occupancy of a computer device and improves hair rendering efficiency. Moreover, by adjusting a pixel distance at a hair edge, it is possible to improve colour relaxation and an anti-aliasing effect of the hair during hair rendering, thereby improving authenticity of target hair.

Detailed implementation of the above operations may be referred to aforementioned embodiments, and will not be repeated herein.

In some examples, as shown in FIG. 4, the computer device 300 further includes a touch screen 303, a radio frequency circuit 304, an audio circuit 305, an input unit 306, and a power supply 307. The processor 301 is electrically connected to the touch screen 303, the radio frequency circuit 304, the audio circuit 305, the input unit 306, and the power supply 307, respectively. It will be appreciated by those skilled in the art that the computer device structure shown in FIG. 4 does not constitute a limitation on the computer device, and may include more or fewer components than illustrated, or may combine some components, or has different component arrangements.

The touch screen 303 may be configured to display a graphical player interface and to receive operational instructions generated by a player acting on the graphical user interface. The touch display screen 303 may include a display panel and a touch panel. The display panel may be used to display information input by or provided to the player and various graphical player interfaces of the computer device, which may be composed of graphics, text, icons, videos, and any combination thereof. The display panel may be configured in a form of a Liquid Crystal Display (LCD), an Organic Light-Emitting Diode (OLED), or the like. The touch panel may be used to collect a touch operation (e.g., an operation of the player on or near the touch panel using any suitable object or accessory such as a finger, a stylus, etc.) of the player on or near the touch panel, and generate a corresponding operation instruction, and the operation instruction executes a corresponding program. The touch panel may include a touch detection device and a touch controller. The touch detection device detects a touch orientation of the player, detects a signal brought about by the touch operation, and transmits the signal to the touch controller. The touch controller receives touch information from the touch detection device and converts the touch information into contact coordinates, sends the contact coordinates to the processor 301, and can receive and execute commands sent from the processor 301. The touch panel may cover the display panel, and when the touch panel detects the touch operation on or near the touch panel, the touch panel transmits the touch operation to the processor 301 to determine a type of a touch event. Then, the processor 301 provides a corresponding visual output on the display panel according to the type of the touch event. In the embodiments of the present disclosure, the touch panel and the display panel may be integrated to the touch screen 303 to implement input and output functions. However, in some embodiments, the touch panel and the touch panel may be implemented as two separate components to implement the input and output functions. That is, the touch screen 303 may implement the input function as part of the input unit 306.

In the embodiments of the present disclosure, a game application is executed by the processor 301 to generate a graphical player interface on the touch display screen 303. The touch screen 303 may be configured to display the graphical player interface and to receive operation instructions generated by the player acting on the graphical user interface.

The radio frequency circuit 304 may be configured to transmit and receive radio frequency signals to establish wireless communication with a network device or other computer devices through wireless communication, and to transmit and receive signals between the network device or other computer devices.

The audio circuit 305 may be used to provide an audio interface between the player and the computer device through a speaker and a microphone. The audio circuit 305 may transmit an electrical signal converted from received audio data to a loudspeaker, and the loudspeaker converts the electrical signal into a sound signal for output. On the other hand, the microphone converts a collected sound signal into an electrical signal, the audio circuit 305 receives and converts the electrical signal into audio data. The audio data is outputted to the processor 301 for processing, and the processed audio data is sent to, for example, another computer device through the radio frequency circuit 304, or the audio data is outputted to the memory 302 for further processing. The audio circuit 305 may also include an earplug jack to provide communication between a peripheral headset and the computer device.

The input unit 306 may be configured to receive input numbers, character information, or player characteristic information (e.g., fingerprints, iris, face information), and to generate keyboard, mouse, joystick, optical, or trackball signal input related to player settings and functional control.

The power supply 307 is configured to power various components of the computer device 300. The power supply 307 may be logically connected to the processor 301 through a power supply management system, so that functions such as charging, discharging, and power consumption management are managed through the power supply management system. The power supply 307 may further include one or more DC or AC power supplies, a recharging system, a power failure detection circuit, a power converter or inverter, a power status indicator, or any other component.

Although not shown in FIG. 4, the computer device 300 may also include a camera, a sensor, a wireless fidelity module, a Bluetooth module, and the like, and details are not described herein.

In the above-mentioned embodiments, the description of each embodiment has its own emphasis, and parts not described in detail in a certain embodiment may be referred to related description of other embodiments.

As can be seen from the above, on one hand, the computer device provided in the embodiments generates the hair particle model through simulation, splits hair into hair particles, and renders the hair particles, which achieves a semi-transparent effect of the target hair reduces video memory occupancy of a computer device, and improves hair rendering efficiency. On the other hand, the embodiments of the present disclosure may further expand each hair particle along a direction perpendicular to a tangent line of hair. By adjusting a pixel distance at a hair edge to adjust current transparency of a hair rendering pixel, it is possible to improve colour relaxation and an anti-aliasing effect of the hair during hair rendering, thereby improving authenticity of the target hair.

It will be appreciated by those of ordinary skill in the art that all or a portion of the operations of the various methods of the above-described embodiments may be performed by instructions, which may be stored in a computer-readable storage medium and loaded and executed by a processor, or may be performed by the instructions through controlling relevant hardware.

To this end, embodiments of the present disclosure provide a computer readable storage medium having stored therein a plurality of computer programs that can be loaded by a processor to perform operations in the method for rendering the hair virtual model provided in embodiments of the present disclosure. For example, the computer programs may perform the following operations:

obtaining particle attribute information of a hair particle in a hair particle model, wherein the hair particle model simulates a target hair rendering effect;

obtaining a hair particle order parameter corresponding to the hair particle model, wherein the hair particle order parameter indicates an order of a respective distance of each hair particle in the hair particle model from a specified reference point in a model space of the hair particle model;

based on the hair particle order parameter, determine a target hair particle of the hair particle in the hair particle model for rendering; and obtaining a rendered hair virtual model for the target hair particle by determining a hair segment rendering region based on the particle attribute information of the target hair particle and rendering the hair segment rendering region.

In some examples, after obtaining the hair particle order parameter corresponding to the hair particle model, the method further includes:

obtaining a number of hair particles in a hair layer corresponding to the hair particle model, wherein the number of hair particles in the hair layer indicates a number of hair particles in the hair layer of the hair particle model, and the hair layer is obtained by layering the model space of the hair particle model based on the specified reference point; and determining the target hair particle based on the number of hair particles in the hair layer and the hair particle order parameter.

In some examples, before obtaining the hair particle order parameter corresponding to the hair particle model, the method further includes:

layering the model space based on a relative distance between the hair particle model and the specified reference point and a specified coordinate axis of the model space, to obtain a plurality of hair layers and a total number of the plurality of hair layers;

determining a hair layer number of the hair layer where the hair particles are located in the hair particle model based on the relative distance and the total number of the plurality of hair layers; and determining the number of the hair particles in the hair layer and the hair particle order parameter based on the hair layer number of the hair layer.

In some examples, the layering the model space based on the relative distance between the hair particle model and the specified reference point and the specified coordinate axis of the model space, to obtain the plurality of hair layers and the total number of the plurality of hair layers includes:

determining a first distance and a second distance between the hair particle model and the specified reference point in the model space, wherein the first distance indicates a minimum distance between the hair particle model and the specified reference point and the second distance indicates a maximum distance between the hair particle model and the specified reference point; and layering the model space based on the first distance, the second distance, and the specified coordinate axis of the model space to obtain the plurality of hair layers and the total number of the plurality of hair layers.

In some examples, after layering the model space based on the first distance, the second distance, and the specified coordinate axis of the model space to obtain the plurality of hair layers and the total number of the plurality of hair layers, the method includes:

determining the hair layer number of the hair layer where the hair particles are located based on the first distance, the second distance, and a target distance corresponding to the hair particle indicating a distance between the hair particle and the specified reference point;

generating a hair layer identifier of the hair layer based on the hair layer number, and associating the hair layer identifier with the hair particle; and performing a prefix sum processing based on the hair layer identifier corresponding to the hair particles in the hair layer in the hair particle model to obtain the number of the hair particles in the hair layer.

In some examples, after layering the model space based on the first distance, the second distance, and the specified coordinate axis of the model space to obtain the plurality of hair layers and the total number of the plurality of hair layers, the method further includes:

sorting all hair particles in the hair particle model from near to far according to the respective distances of the hair particles from the specified reference point based on the hair layer identifiers respectively corresponding to the hair particles, to generate the hair particle order parameter.

In some examples, the method further includes:

classifying all the hair particles in the hair particle model based on a number of hair particles in each of the plurality of hair layers and the hair particle order parameter to obtain a plurality of hair particle sets, wherein ones of all the hair particles in each of the hair particle sets belong to a same hair layer of the plurality of hair layers and are arranged in order;

generating a hair particle sorting result based on the plurality of hair particle sets; and determining the target hair particle according to the hair particle sorting result.

In some examples, obtaining the rendered hair virtual model by determining the hair segment rendering region based on the particle attribute information of the target hair particle and rendering the hair segment rendering region includes:

obtaining an initial hair width corresponding to the target hair particle based on the particle attribute information of the target hair particle;

determining a width adjustment value for the initial hair width based on a distance between the target hair particle and the specified reference point;

adjusting the initial hair width based on the width adjustment value to obtain an adjusted hair width;

determining a plurality of region rendering vertices corresponding to the hair segment rendering region based on the adjusted hair width;

rendering a plurality of polygonal grids based on the plurality of region rendering vertices; and generating the hair virtual model based on the plurality of polygon grids.

In some examples, after generating the hair virtual model based on the plurality of polygonal grids, the method further includes:

determining a hair rendering pixel located in the hair segment rendering region;

determining a relative distance between the hair rendering pixel and a tangent line of the target hair particle as a pixel distance; and adjusting current transparency of the hair rendering pixel based on the pixel distance.

In some examples, the adjusting of the current transparency of the hair rendering pixel based on the pixel distance includes:

performing a smoothness calculation based on a pixel width of the hair rendering pixel, the pixel distance, a preset conversion ratio, and a specified constant to obtain a transparency adjustment value for the hair rendering pixel; and adjusting the current transparency of the hair rendering pixel based on the transparency adjustment value to obtain an adjusted hair rendering pixel.

Some embodiments of the present disclosure provide methods and apparatuses for rendering a hair virtual model, computer devices, and storage media, which: obtain particle attribute information of a hair particle in a hair particle model, wherein the hair particle model simulates a target hair rendering effect; obtain a hair particle order parameter corresponding to the hair particle model, wherein the hair particle order parameter indicates an order of a respective distance of each hair particle in the hair particle model from a specified reference point in a model space of the hair particle model; based on the hair particle order parameter, determine a target hair particle of the hair particle in the hair particle model for rendering; and finally obtain a rendered hair virtual model for the target hair particle by determining a hair segment rendering region based on the particle attribute information of the target hair particle and rendering the hair segment rendering region. The embodiments of the present disclosure generate a hair particle model through simulation, and split hair into hair particles, and rendering the hair particles, which reduces video memory occupancy of a computer device and improves hair rendering efficiency. Moreover, by adjusting a pixel distance at a hair edge, it is possible to improve colour relaxation and an anti-aliasing effect of the hair during hair rendering, thereby improving authenticity of target hair.

Detailed implementation of the above operations may be referred to aforementioned embodiments, and will not be repeated herein.

The storage medium may include a Read Only Memory (ROM), a Random Access Memory (RAM), a magnetic disk, an optical disk, or the like.

Due to the computer programs stored in the storage medium, the operations in any of a method for rendering a hair virtual model provided in the embodiments of the present disclosure may be executed. Thus, advantageous effects that can be achieved in any one of the methods for rendering the hair virtual model provided in the embodiments of the present disclosure can be realized. Details may be referred to the foregoing embodiments, which are not described herein.

In the above-mentioned embodiments, the description of each embodiment has its own emphasis. For parts not described in detail in a certain embodiment, related description of other embodiments may be referred to.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. A method for rendering a hair virtual model, comprising:

obtaining, by a terminal, particle attribute information of a hair particle in a hair particle model, wherein the hair particle model simulates the target hair rendering effect;

obtaining, by the terminal, a hair particle order parameter corresponding to the hair particle model, wherein the hair particle order parameter indicates an order of respective distances of each hair particle in the hair particle model from a specified reference point in a model space of the hair particle model;

based on the hair particle order parameter, determining a target hair particle of the hair particle in the hair particle model for rendering; and obtaining, by the terminal, a rendered hair virtual model for the target hair particle by determining a hair segment rendering region based on the particle attribute information of the target hair particle and rendering the hair segment rendering region, wherein the obtaining of the rendered hair virtual model comprises:

obtaining an initial hair width corresponding to the target hair particle based on the particle attribute information of the target hair particle;

determining a width adjustment value for the initial hair width based on a distance between the target hair particle and the specified reference point;

adjusting the initial hair width based on the width adjustment value to obtain an adjusted hair width;

determining a plurality of region rendering vertices corresponding to the hair segment rendering region based on the adjusted hair width;

rendering a plurality of polygonal grids based on the plurality of region rendering vertices; and generating the rendered hair virtual model based on the plurality of polygonal grids.

2. The method for rendering the hair virtual model of claim 1, further comprising:

obtaining a number of hair particles in a hair layer corresponding to the hair particle model, wherein the number of hair particles in the hair layer indicates a number of hair particles in the hair layer of the hair particle model, and the hair layer is obtained by layering the model space of the hair particle model based on the specified reference point; and determining the target hair particle based on the number of hair particles in the hair layer and the hair particle order parameter.

3. The method for rendering the hair virtual model of claim 2, further comprising:

layering the model space based on a relative distance between the hair particle model and the specified reference point and a specified coordinate axis of the model space, to obtain a plurality of hair layers and a total number of the plurality of hair layers;

determining a hair layer number of the hair layer where the hair particles are located in the hair particle model based on the relative distance and the total number of the plurality of hair layers; and determining the number of hair particles in the hair layer and the hair particle order parameter based on the hair layer number of the hair layer.

4. The method for rendering the hair virtual model of claim 3, wherein layering the model space further comprises:

determining a first distance and a second distance between the hair particle model and the specified reference point in the model space, wherein the first distance indicates a minimum distance between the hair particle model and the specified reference point and the second distance indicates a maximum distance between the hair particle model and the specified reference point; and layering the model space based on the first distance, the second distance, and the specified coordinate axis of the model space.

5. The method for rendering the hair virtual model of claim 4, wherein determining the hair layer number of the hair layer comprises:

determining the hair layer number of the hair layer where the hair particles are located based on the first distance, the second distance, and a target distance corresponding to the hair particle indicating a distance between the hair particle and the specified reference point; and determining the number of hair particles in the hair layer comprises:

generating a hair layer identifier of the hair layer based on the hair layer number, and associating the hair layer identifier with the hair particle; and performing a prefix sum processing based on the hair layer identifier corresponding to the hair particles in the hair layer in the hair particle model to obtain the number of the hair particles in the hair layer.

6. The method for rendering the hair virtual model of claim 5, wherein determining the hair particle order parameter comprises:

sorting all hair particles in the hair particle model from near to far according to respective distances of all the hair particles from the specified reference point based on hair layer identifiers respectively corresponding to the hair particles, to generate the hair particle order parameter.

7. The method for rendering the hair virtual model of claim 5, wherein determining the target hair particle based on the number of hair particles in the hair layer and the hair particle order parameter comprises:

classifying all hair particles in the hair particle model based on a number of hair particles in each of the plurality of hair layers and the hair particle order parameter to obtain a plurality of hair particle sets, wherein ones of all the hair particles in each of the hair particle sets belong to a same hair layer of the plurality of hair layers and are arranged in order;

generating a hair particle sorting result based on the plurality of hair particle sets; and determining the target hair particle according to the hair particle sorting result.

8. The method for rendering the hair virtual model of claim 1, further comprising:

determining a hair rendering pixel located in the hair segment rendering region;

determining a relative distance between the hair rendering pixel and a tangent line of the target hair particle as a pixel distance; and adjusting current transparency of the hair rendering pixel based on the pixel distance.

9. The method for rendering the hair virtual model of claim 8, wherein the adjusting of the current transparency of the hair rendering pixel based on the pixel distance comprises:

performing a smoothness calculation based on a pixel width of the hair rendering pixel, the pixel distance, a preset conversion ratio, and a specified constant to obtain a transparency adjustment value for the hair rendering pixel; and adjusting the current transparency of the hair rendering pixel based on the transparency adjustment value to obtain an adjusted hair rendering pixel.

10. The method of claim 1, wherein the particle attribute information comprises a location of the hair particle in the model space of the hair particle model and a tangential attribute of the hair particle.

11. The method of claim 4, wherein layering the model space comprises:

layering the model space into a preset number of hair layers based on the first distance, the second distance, and the specified coordinate axis of the model space.

12. The method of claim 11, wherein the preset number of hair layers is 1024 or 2048.

13. The method of claim 11, wherein a thickness of each of the preset number of hair layers represents a distance interval between the hair particle and is determined according to a following equation:

$$\text{Thickness of each hair layer} = \frac{\max - \min}{\text{preset number of hair layers}},$$

where min represents the first distance and max represents the second distance.

14. The method of claim 11, wherein determining the hair layer number of the hair layer where the hair particles are located based on the first distance, the second distance, and the target distance comprises:

determining the hair layer number of the hair layer according to a following equation:

$$\text{Hair layer number} = \frac{(dis - \min)}{(\max - \min)} \times \text{present number of hair layers},$$

where dis represents the target distance, min represents the first distance, and max represents the second distance.

15. A computer device, comprising a processor and a memory storing a computer program executable by the processor to perform operations comprising:

obtaining particle attribute information of a hair particle in a hair particle model, wherein the hair particle model simulates the target hair rendering effect;

obtaining a hair particle order parameter corresponding to the hair particle model, wherein the hair particle order parameter indicates an order of respective distances of each hair particle in the hair particle model from a specified reference point in a model space of the hair particle model;

based on the hair particle order parameter, determining a target hair particle of the hair particle in the hair particle model for rendering; and obtaining a rendered hair virtual model for the target hair particle by determining a hair segment rendering region based on the particle attribute information of the target hair particle and rendering the hair segment rendering region, wherein the obtaining of the rendered hair virtual model comprises:

obtaining an initial hair width corresponding to the target hair particle based on the particle attribute information of the target hair particle;

determining a width adjustment value for the initial hair width based on a distance between the target hair particle and the specified reference point;

adjusting the initial hair width based on the width adjustment value to obtain an adjusted hair width;

determining a plurality of region rendering vertices corresponding to the hair segment rendering region based on the adjusted hair width;

rendering a plurality of polygonal grids based on the plurality of region rendering vertices; and generating the rendered hair virtual model based on the plurality of polygonal grids.

16. The computer device of claim 15, wherein the operations further comprise:

obtaining a number of hair particles in a hair layer corresponding to the hair particle model, wherein the number of hair particles in the hair layer indicates a number of hair particles in the hair layer of the hair particle model, and the hair layer is obtained by layering the model space of the hair particle model based on the specified reference point; and determining the target hair particle based on the number of hair particles in the hair layer and the hair particle order parameter.

17. The computer device of claim 15, wherein the operations further comprise:

layering the model space based on a relative distance between the hair particle model and the specified reference point and a specified coordinate axis of the model space, to obtain a plurality of hair layers and a total number of the plurality of hair layers;

determining a hair layer number of the hair layer where the hair particles are located in the hair particle model based on the relative distance and the total number of the plurality of hair layers; and determining the number of hair layer particles in the hair layer and the hair particle order parameter based on the hair layer number of the hair layer.

18. A non-transitory computer-readable storage medium storing a computer program executable by a processor to perform operations comprising:

obtaining particle attribute information of a hair particle in a hair particle model, wherein the hair particle model simulates the target hair rendering effect;

obtaining a hair particle order parameter corresponding to the hair particle model, wherein the hair particle order parameter indicates an order of respective distances of each hair particle in the hair particle model from a specified reference point in a model space of the hair particle model;

based on the hair particle order parameter, determining a target hair particle of the hair particle in the hair particle model for rendering; and obtaining a rendered hair virtual model for the target hair particle by determining a hair segment rendering region based on the particle attribute information of the target hair particle and rendering the hair segment rendering region, wherein the obtaining of the rendered hair virtual model comprises:

obtaining an initial hair width corresponding to the target hair particle based on the particle attribute information of the target hair particle;

determining a width adjustment value for the initial hair width based on a distance between the target hair particle and the specified reference point;

adjusting the initial hair width based on the width adjustment value to obtain an adjusted hair width;

determining a plurality of region rendering vertices corresponding to the hair segment rendering region based on the adjusted hair width;

rendering a plurality of polygonal grids based on the plurality of region rendering vertices; and generating the rendered hair virtual model based on the plurality of polygonal grids.

* * * * *